April 3, 1951  A. R. SCHULZE  2,547,667
RESILIENT WHEEL FOR RAIL CARS
Filed Oct. 27, 1948  4 Sheets-Sheet 1
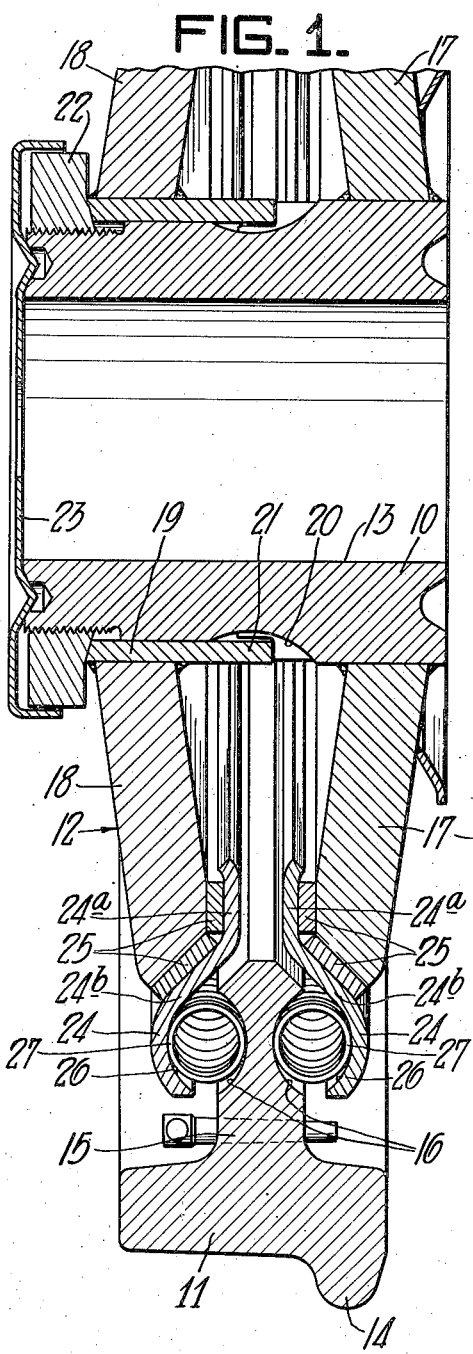
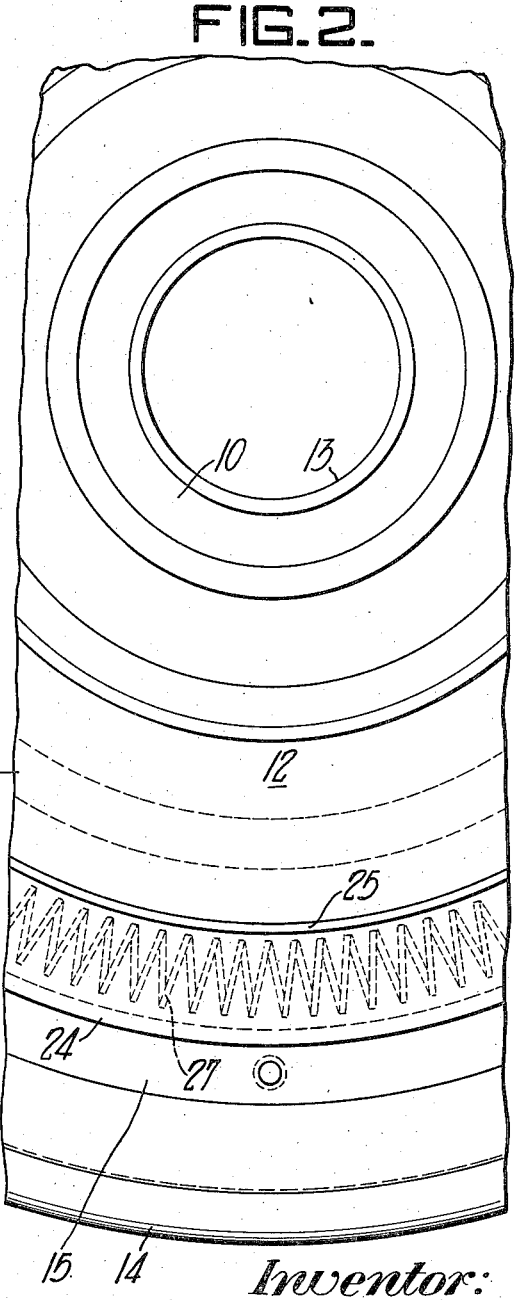
Inventor:
ARTHUR R. SCHULZE,
by: Donald G. Dalton
his Attorney.

April 3, 1951     A. R. SCHULZE     2,547,667
RESILIENT WHEEL FOR RAIL CARS

Filed Oct. 27, 1948     4 Sheets-Sheet 2

*Inventor:*
ARTHUR R. SCHULZE,
by: Donald G. Dalton
his Attorney.

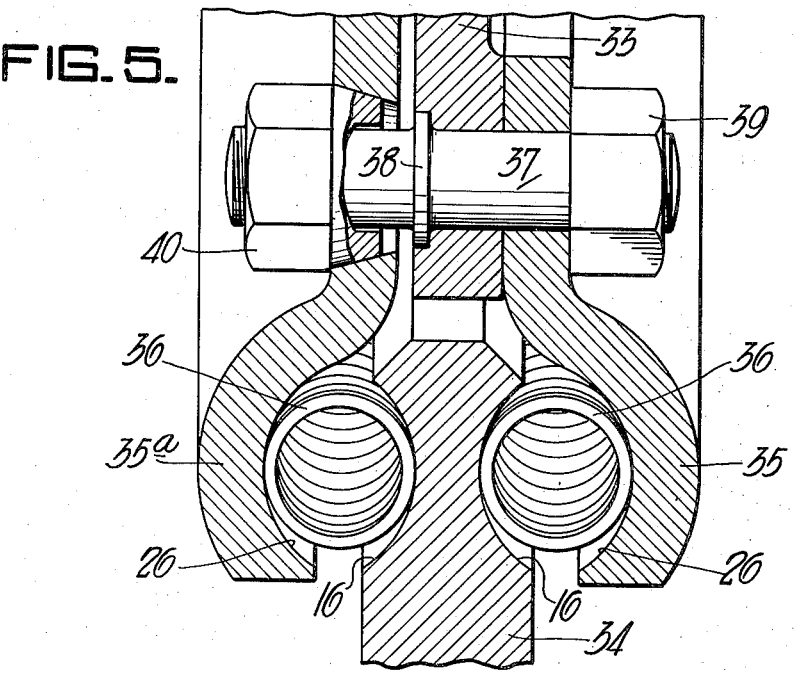
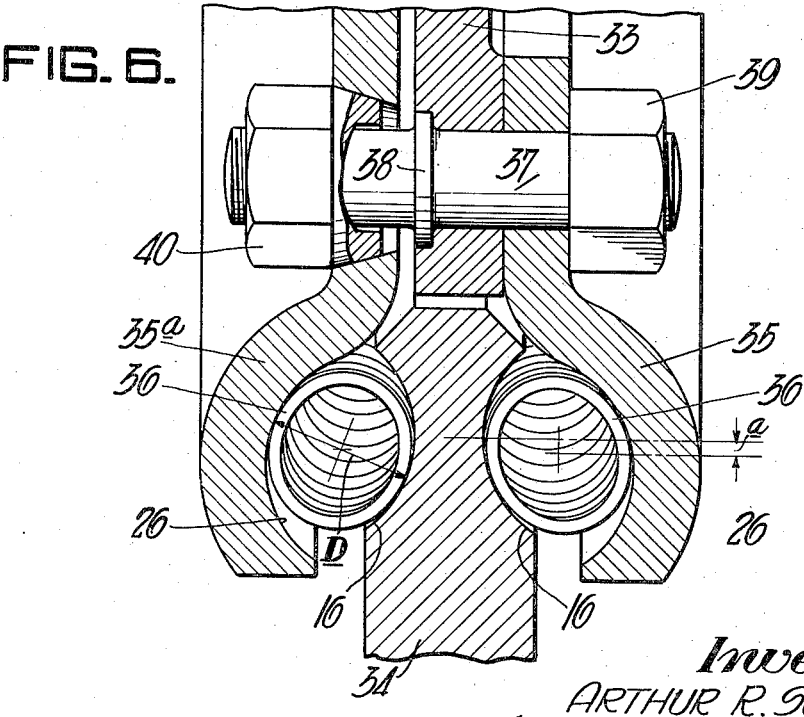

April 3, 1951   A. R. SCHULZE   2,547,667
RESILIENT WHEEL FOR RAIL CARS
Filed Oct. 27, 1948   4 Sheets-Sheet 4
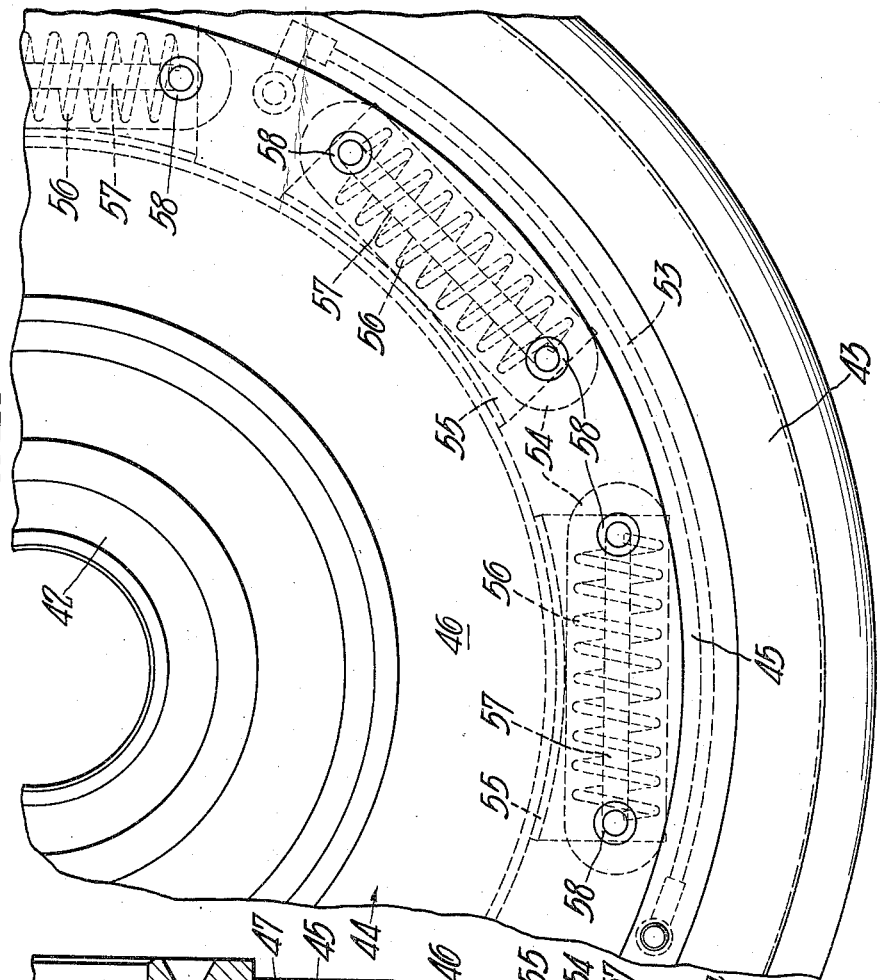
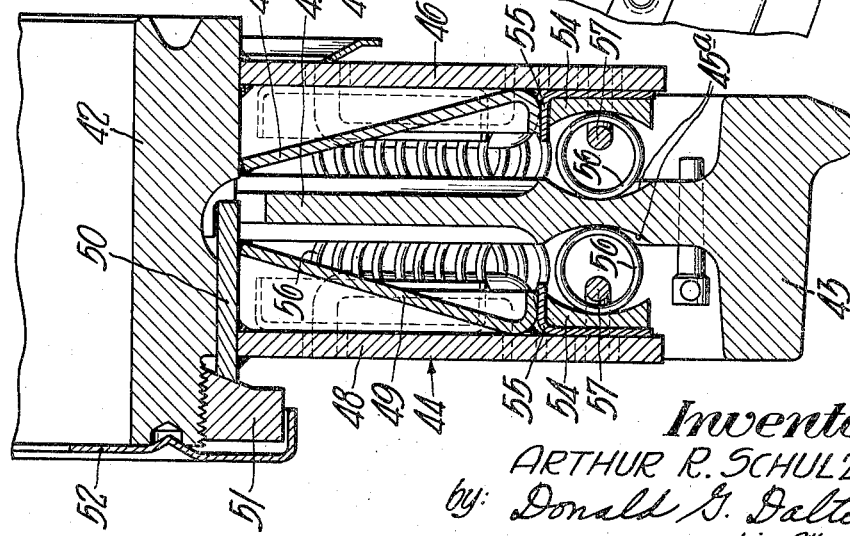
Inventor:
ARTHUR R. SCHULZE,
by: Donald G. Dalton
his Attorney.

Patented Apr. 3, 1951

2,547,667

UNITED STATES PATENT OFFICE 2,547,667

RESILIENT WHEEL FOR RAIL CARS

Arthur R. Schulze, Johnstown, Pa., assignor to United States Steel Company, a corporation of New Jersey Application October 27, 1948, Serial No. 56,830

15 Claims. (Cl. 295—14)

This invention relates to resilient wheels for rail vehicles and, in particular, to a wheel having a rim separate from the hub and yieldably mounted thereon.

Resilient car wheels have come into extensive use in recent years, particularly on street-railway cars. These wheels have all been of the rubber-sandwich type, so far as I am aware. While generally satisfactory, they are costly and the life of the rubber elements is rather limited. I have invented an improved resilient wheel composed largely or entirely of metal parts, which can be made at lower cost than a wheel of the rubber-sandwich type yet compares favorably therewith from the standpoint of quietness and has a practically indefinite life.

In a preferred embodiment, I provide a wheel rim having a web extending inwardly therefrom. One or more helical springs are disposed on each side of the web in sidewise engagement therewith. The springs are held snugly against the web by means carried on the hub and fit in troughs or grooves in the web and such securing means. The springs thus provide a mounting for the rim on the hub characterized by a slight yield under a load applied radially to the hub. The springs are also compressed transversely under the horizontal forces resulting from the impact of the rim flange on the rail head in traversing curves or passing switches. The securing means includes discs each having a peripheral trough adapted to accommodate the spring or springs on one side of the web. The springs may be continuous around the entire circumference of the web or a plurality of straight springs disposed in tangential positions may be used instead.

A complete understanding of the invention may be obtained from the following detailed description and explanation which refer to the accompanying drawings illustrating a preferred embodiment and modifications thereof. In the drawings, Figure 1 is a partial axial section through one form of wheel according to the invention;

Figure 2 is a partial elevation thereof;

Figure 5 is a partial section similar to Figure 3 on an enlarged scale showing the conditions under no radial load;

Figure 6 is a view similar to Figure 5 showing the conditions existing when the wheel is subjected to the normal radial load;

Figure 7 is a view similar to Figure 1 showing a further modification; and

Figure 8 is a partial side elevation thereof.

Figure 3:
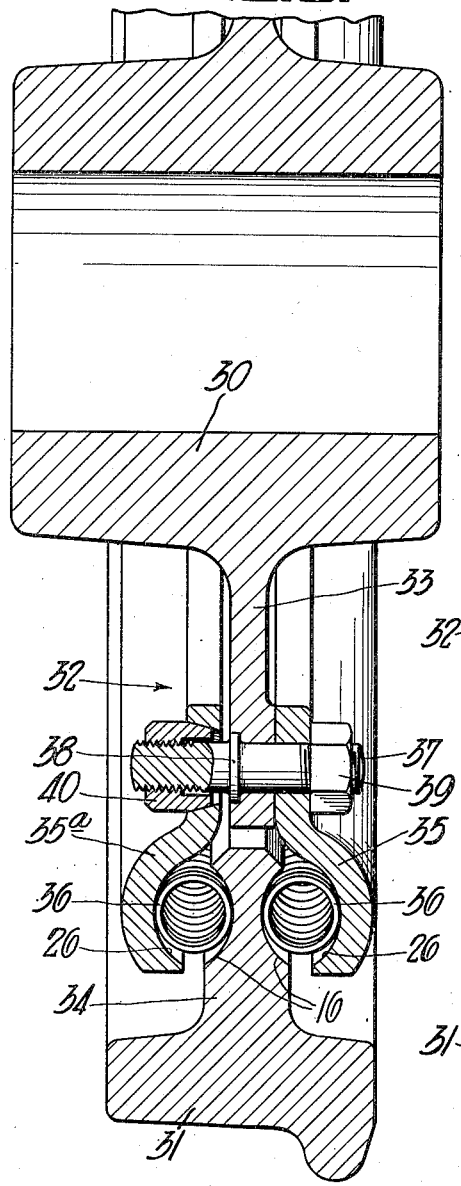
Figure 3 is a view similar to Figure 1 showing the preferred embodiment.

Referring in detail to the drawings and, for the present, to Figures 1 and 2, the wheel there shown comprises a hub 10, a rim or tread portion 11 formed separately therefrom and a composite web indicated generally at 12. The hub has a central bore 13 adapted to receive the usual axle. The rim 11 has a flange 14 and a partial web 15. This web has circumferential troughs or grooves 16 on opposite sides thereof.

The web 12 comprises a dished circular plate 17 welded to one end of the hub. A second dished circular plate 18 is welded to a sleeve 19 slidable on the other end of the hub. The hub has slots 20 spaced circumferentially about its mid-section adapted to receive lugs 21 spaced circumferentially of the inner end of the sleeve 19. The sleeve is held in place on the hub by a nut 22 threaded onto the end thereof. A cover 23 overlies the nut.

A pair of opposed discs or rings 24 have their inner edges disposed between the plates 17 and 18. Rings 25 of a cushioning material are disposed between the opposed surfaces of the plates and the rings. The discs have plane inner portions 24ª and frusto-conical outer portions 24ᵇ engaged (through the medium of rings 25) by similarly shaped portions of plates 17 and 18. The discs have circumferential troughs 26 adjacent their outer periphery lying opposite the troughs 16 in the web 15 of the rim 11.

Helical springs 27 are disposed in the annular spaces defined by the troughs 16 and 26 which serve as seats for the springs. The springs may conveniently extend continuously in single length around the entire circumference of the wheel. It will be evident that the plates 17 and 18 together with the rings or discs 24, when compressed by nut 22, serve to press the springs against the web 15 and subject them to an initial side loading depending on the extent to which the nut is turned down. The side-loaded springs form a metallic cushion between the rim 11 and webs 12 which effectively absorbs shock applied to the former and reduces the noise resulting from travel of the wheel along the rail. The noise reduction probably results from the differences in frequency of vibration of the several parts of the wheel because of their different masses and materials. This tends to check vibration and reduce it instead of permitting it to build up. The springs may be made in straight lengths and have their ends joined by any suitable means after being bent to circular shape. The dimensions and strength of the springs, of course, will affect the load capacity of the wheel and the degree of cushioning afforded for the rim relative to the remainder of the wheel. For greater capacity, a plurality of nested or concentric springs may be used on both sides of the web. The springs, furthermore, instead of being in one piece, may be sectional, i. e., made up of a plurality of separate spring lengths disposed in short straight grooves. The troughs or grooves 16 and 26 in which the springs are disposed are illustrated as being arcuate in section. Increased wheel capacity may be obtained, however, by using grooves having a section defined by a broken line such as V-bottom or flat-bottom with sloping sides. The troughs 16 and 26, as shown, engage the turns of the springs 27 only at the sides thereof, leaving the tops and bottoms free for deflection.

Figure 4:
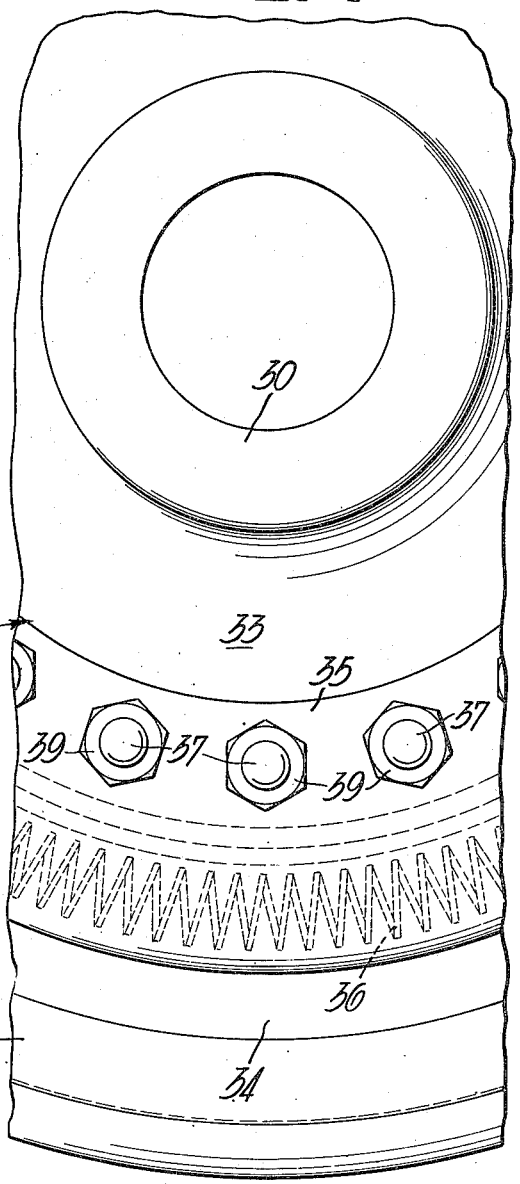
Figure 4 is a partial side elevation thereof.

Figures 3 and 4 illustrate a different form of wheel which is the preferred structure for general use. It comprises a hub 30, a rim 31 and a composite web 32. The hub and rim have partial webs 33 and 34, respectively, the latter being similar to the web 15 of Figure 1. Opposed discs or rings 35 and 35ª, generally similar to the discs 24 of Figure 1, are secured to opposite faces of the web 33 and serve to clamp helical springs 36, similar to those shown at 27 in Figure 1, against the lateral faces of the web 34. The discs 35 and 35ª are secured to the web 33 by circumferentially-spaced studs 37, each having a shoulder 38 seated in a counterbore in one face of the web. Each stud is secured to the web 33 by a nut 39 which also secures the disc 35 to the web. The disc 35ª is secured to the web by nuts 40 threaded on the studs. The nuts 40 are frusto-conical at their inner ends and seat in similarly shaped holes in the disc 35ª.

The action of the springs may be better understood from a consideration of Figures 5 and 6. Figure 5 illustrates the no-load condition which always exists at the front and rear quadrants of the wheel. The greater portion of the radial load is carried by the portions of the springs in the top and bottom quadrants and every point on the spring thus goes through a cycle of varying load conditions as the wheel turns. Under no load, the springs 36 are positioned symmetrically in the troughs 16 and 26 of discs 35 and 35ª. It will be noted that the troughs have a greater radius than the springs. As the load is applied, the springs in the bottom quadrant roll down the sides of troughs 16 and upwardly on the sides of troughs 26 as the rim moves eccentrically of the hub. The rolling action of the springs in the top quadrant is the reverse. The downward movement of the spring is indicated at $a$. This movement is resisted and limited by lateral compression of the turns of the helical spring. That is, from the normal circular condition shown in Figure 5, the turns are compressed along the diameter D to a slightly elliptical shape. The initial side loading of each turn of the spring is thus increased as it passes around the top and bottom quadrants but returns to normal in passing through the quadrants at the front and rear sides. There is a slight twisting of the turns in the side quadrants as a result of the eccentric rotation of the rim relative to the hub.

Horizontal forces applied to the wheel rim tend to tilt it out of the plane of the web and are resisted by lateral compression of the spring turns as explained above. Considering a force applied to the rim at the bottom in a leftward direction, the spring turns on the left or outer side of the wheel at the bottom would be compressed along with the turns on the right or inner side at the top. Horizontal forces do not cause any rolling of the springs in the troughs. In resisting horizontal or radial forces, however, the springs act by lateral compression or side loading of the individual turns.

Figures 7 and 8 show a further modification generally similar to that of Figures 1 and 2. It comprises a hub 42, a rim 43 and a composite web 44. The hub and rim are similar to the corresponding parts shown in Figure 1, except that the web 45 of the rim extends farther inwardly toward the hub than does the web 15 of Figure 1. It has circumferential grooves or troughs 45ª like those shown at 16. The web 44 comprises a plane plate 46 welded to one end of the hub and braced by a dished plate 47 welded thereto and to the hub at a transverse plane thereof spaced from the end. Similar plates 48 and 49 are welded to the sleeve 50 which corresponds to the sleeve 19 of Figure 1 and are held in place by a nut 51 provided with a cover 52. A conducting bond 53 extends between taper pins driven into holes in the plate 48 and the web 45, respectively.

Straight spring seats 54 are spaced circumferentially about the outer periphery of the plates 46 and 48 with a layer of cushioning material 55 between them. Straight helical springs 56 are disposed in tangential positions between the trough-shaped inner faces of the seats and circumferential troughs 45ª formed in the web 45 adjacent the rim and are subjected to side loading by clamping, on turning down the nut 51. A shackle 57 extends through each spring and has its ends set in bushings 58 of resilient composition inserted in holes in one of the plates 46 and 48. It will be evident that the wheel shown in Figures 7 and 8, except for minor mechanical details, differs from the construction shown in Figures 1 and 2 only in the use of a plurality of straight helical springs spaced circumferentially of the wheel, instead of continuous springs in the form of circles. Continuous springs may be used in the modification of Figures 7 and 8 by substituting circular spring seats for the straight seats 54.

It will be apparent from the foregoing that the invention provides an all-metal resilient wheel having good shock-absorbing properties resulting from the use of side-loaded helical springs as the sole connection and load-transmitting medium between the rim and web. The improved wheel is highly durable, because of its substantially all-metal construction and may be made at low cost since it comprises but a relatively small number of simple parts well adapted for quantity production.

The all-metal construction, furthermore, permits conventional rim braking which is not feasible with rubber-sandwich wheels and affords the possibility of eliminating the bonds 53 altogether with a further reduction in initial assembly cost as well as minimizing maintenance and replacement cost. The springs may be made of a known corrosion-resistant steel which is heat-treatable, thereby avoiding the necessity for protection against the weather. The wire of which the springs are made may be square with rounded corners as well as the round wire shown.

Although I have illustrated and described only a preferred embodiment and two modifications of the invention, it will be recognized that changes in the details disclosed may be made without departing from the spirit of the invention or the scope of the appended claims.

I claim:

1. A wheel for rail cars comprising a rim, a hub, a web on the rim extending toward the hub, a web extending from the hub toward the rim and resilient means bridging the gap between the webs including at least one pair of helical springs, one on each side of one of said webs disposed substantially circumferentially of the rim, and a pair of clamping discs supported by the other web engaging said springs sidewise, said one of said webs and said discs engaging the turns of the springs only at the sides.

2. The wheel defined by claim 1 characterized by said discs having peripheral troughs adapted to accommodate said springs.

3. The wheel defined by claim 1 characterized by circumferentially spaced bolts extending through said discs and said other web.

4. The wheel defined by claim 1 characterized by said springs extending continuously around substantially the entire circumference of the discs.

5. A wheel for rail cars comprising a rim, a hub, a web on the rim extending toward the hub, a web member on the hub, a circumferential helical spring on each side of said web in sidewise engagement therewith and means on said web member compressing said springs laterally against said web, said web and said means engaging the turns of the springs only at the sides.

6. A wheel for rail cars comprising a rim, a hub, a web on the rim extending toward the hub, a pair of web members spaced along the hub, one on each side of said web, a circumferential helical spring on each side of said web in sidewise engagement therewith and means compressing said springs laterally against the web, said web and said means engaging the turns of the springs only at the sides.

7. The wheel defined by claim 6 characterized by a plurality of pairs of substantially straight springs disposed in tangential positions spaced around the circumference of the web.

8. The wheel defined by claim 7 characterized by shackles securing said springs to said one of said web members.

9. A wheel for rail cars comprising a circular rim, a hub disposed centrally thereof, a web on the rim extending inwardly thereof, clamping discs mounted on said hub, one spaced on each side of said web and extending outwardly beyond the inner edge thereof, a helical spring disposed circumferentially of the wheel and compressed sidewise between each disc and said web, said discs and web having opposed circumferential troughs in which the springs are seated, said troughs engaging the turns of the springs only at the sides thereof, leaving the tops and bottoms thereof free for deflection.

10. The wheel defined by claim 9 characterized by a nut threaded on said hub effective to draw said discs together.

11. The wheel defined by claim 9 characterized by clamping bolts extending through said discs.

12. The wheel defined by claim 9 characterized by one of said discs being fixed relative to said hub and the other being adjustable axially thereof.

13. The wheel defined by claim 9 characterized by web plates spaced along said hub, one fixed and one movable thereon, one of said discs seating against each of said plates.

14. The wheel defined by claim 9 characterized by said discs and plates having conical contacting surfaces.

15. The wheel defined by claim 9 characterized by a web on the hub extending between said discs, said discs being secured to said last-mentioned web.

ARTHUR R. SCHULZE.

REFERENCES CITED

The following references are of record in the file of this patent:

UNITED STATES PATENTS

| Number | Name | Date |
| --- | --- | --- |
| 747,343 | Ahlquist | Dec. 22, 1903 |
| 2,383,850 | Dilwroth | Aug. 28, 1945 |

FOREIGN PATENTS

| Number | Country | Date |
| --- | --- | --- |
| 760,632 | France | Sept. 8, 1933 |
| 43,990 | France | Sept. 25, 1934 |